Patented May 27, 1924.

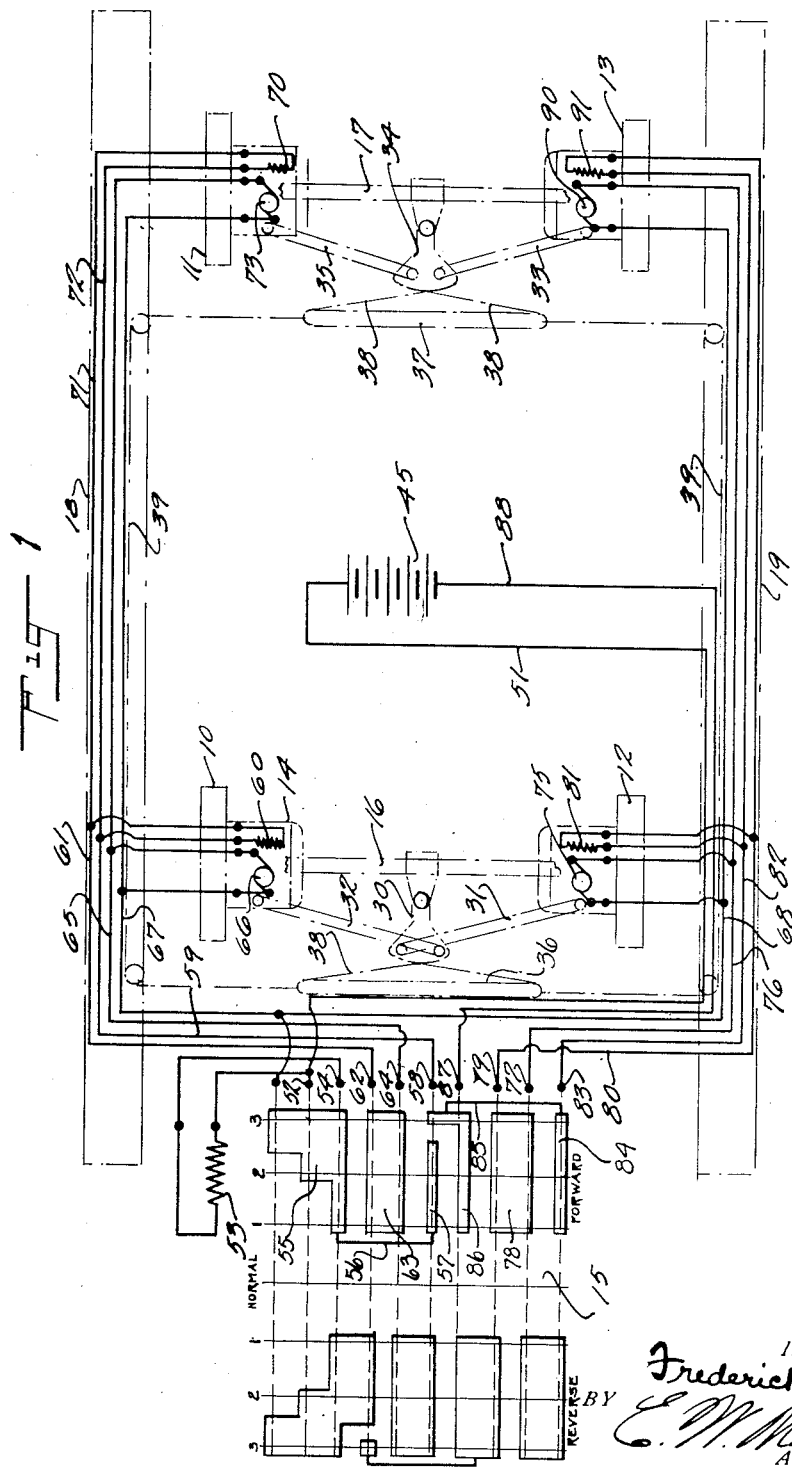

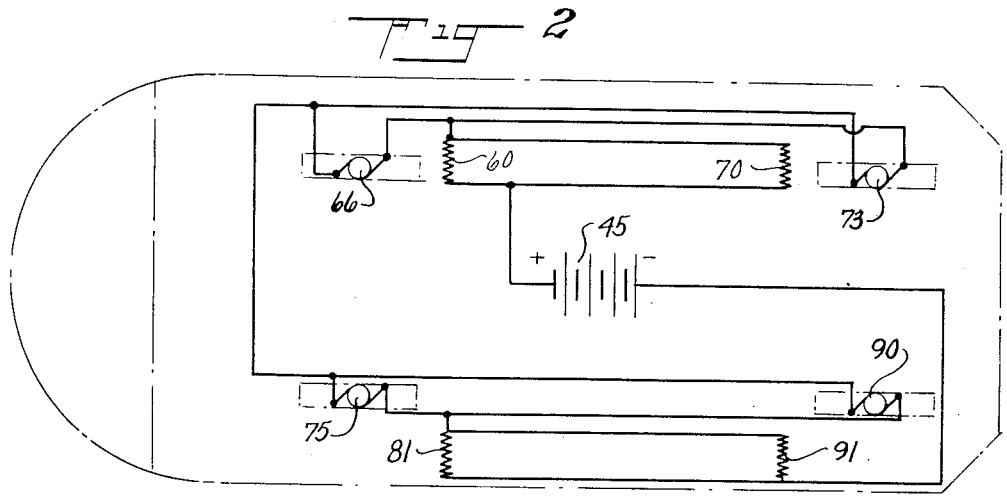
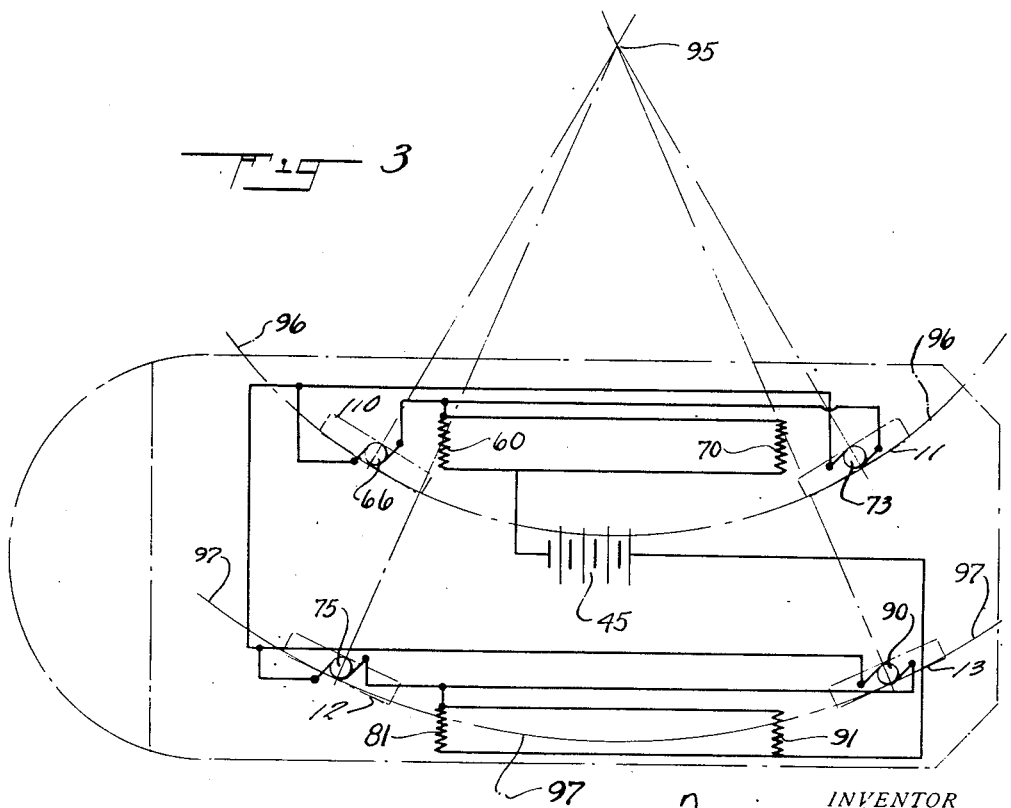

1,495,788

UNITED STATES PATENT OFFICE

FREDERICK FRANZ, OF NEW YORK, N. Y., ASSIGNOR TO WILLARD C. BRINTON, OF NEW YORK, N. Y.

VEHICLE MOTOR CONTROL.

Application filed December 16, 1921. Serial No. 522,841.

*To all whom it may concern:*

Be it known that I, FREDERICK FRANZ, a citizen of the United States, and a resident of New York city, county of New York, and State of New York, have invented certain new and useful Improvements in Vehicle Motor Controls, of which the following is a specification.

This invention relates to motor vehicles and more particularly to vehicles driven by a plurality of electrical means.

Broadly stated it is the object of the invention to simplify the wiring of the vehicle and to improve the operation of the driving motors when rounding sharp curves.

According to one feature of the invention motors are provided for driving the vehicle, one for each wheel, and connections from the motors to a source of energy are provided in a simple and improved manner.

According to another feature, the counter electromotive forces set up in the motor armatures when the vehicle goes around a curve, are equalized in a highly efficient and economical manner.

Other objects will appear as the description of the invention progresses.

Referring to the drawings:

Fig. 1 shows diagrammatically a motor truck embodying my invention.

Fig. 2 shows in schematic form the electrical circuits of the motors in the low speed positions of the controller; and Fig. 3 shows the same wiring in schematic form, and illustrates the electrical conditions when the truck is steered around a sharp curve.

Like reference characters denote like parts in the several figures of the drawings.

Referring to the drawing one embodiment of the present invention comprises a frame having the longitudinal member 18, 19, resiliently supported by suitable springs (not shown) upon the wheels, 10, 11, 12, 13. The wheels 10 and 12 form a pair which, for convenience, may be designated the front pair, pivotally connected with the ends of an axle 16, and similarly the rear wheels 11, 13 are pivoted to the ends of the rear axle 17. Associated with each wheel is a motor 14 geared to the wheel, the motor housing and the load plane of the wheel being arranged to rotate with respect to the frame members 18, 19.

For rotating the planes of the wheels concurrently, I prefer to employ a steering gear mechanism such as is shown in application of W. C. Brinton, Serial No. 522,987 filed December 17, 1921 "steering gear mechanism", so much of said steering gear being shown in the present embodiment as is necessary to an understanding of the present invention.

The steering element for the front pair of the wheels comprises a segment 30 pivotally mounted upon the axle 16 at a point substantially midway between the wheels 10, 12. Connecting the motor housing of wheel 12 with a point in the segment 30 spaced from the central or pivotal line of the segment 70 is a link 31, and a similar link 32 operatively interconnects the segment 30 with the wheel structure of wheel 10. It will be noted that rotation of the segment 30 in one direction, as for example, in a clockwise direction, causes the angularity of the wheel 10 to be displaced to a greater degree than that of wheel 12, since the segment end of link 32 moves in a curve more or less perpendicular to the plane of its respective wheel, while the corresponding end of link 31 moves in an arc more or less parallel to the plane of wheel 12.

A second segment 34 is pivotally mounted on the rear axle 17 at a point substantially midway between the wheels 11 and 13. Links 33, 35 operatively connect the segment 34 with the motor housings of wheels 13 and 11 respectively.

It will be noted that the segment ends of the links 33 and 35 do not cross over so that when the segment 34 is rotated in one direction as, for example, in a counter clockwise direction, the angularity of the wheel 13 is displaced to a less degree than that of wheel 11, since the segment end of link 33 is moved in an arc more or less parallel with the plane of wheel 13, while the corresponding end of link 35 is moved in an arc more or less perpendicular to the wheel 11.

A slide bar 36 is arranged to be slidable in a direction transverse to the frame members 18, 19 on sliding supports (not shown), and is operatively connected to a similar rear slide 37 by a flexible means 39, such as a chain mounted on suitable sprockets. Each of the slides 36, 37 is operatively connected to the respective segments 30, 34 by a flexible means 38, such as a rope or cable.

It will be noted that this form of steering mechanism provides members positioned at points intermediate the wheels which form a pair, and it will be readily understood that in the several positions of the wheels when turning corners the steering mechanism takes up a variety of positions. Thus it is of importance to keep the space between such wheels clear of mechanism other than the steering gear.

For actuating the wheel motors, there is provided a source of energy such as a battery 45, preferably positioned in a portion of the truck intermediate the pairs of wheels.

For controlling the connections between the battery 45 and the motors, controller 15 is provided comprising a plurality of fingers adapted to contact with variously characterized contacting plates.

In the neutral position of controller 15, said fingers make no contacts with the plates and the motors remain inactive. The controller has a two directional movement whereby the motors may be driven either in a forward direction or reversed as desired. As shown in Fig. 1, the operation of the controller is similar in the two directions of movement with the single exception that the direction of current in the motor armatures with respect to the field windings is reversed when the controller is reversed. Assuming that the truck is to be moved in a forward direction, the handle of the controller is moved to position 1 forward, whereupon the following circuit is closed:

Battery 45, conductor 51, finger 52, resistance coil 53, finger 54, contact plate 55, conductor 56, contact plate 57, finger 58, conductor 59, field winding 60 of the motor which drives wheel 10, conductor 61, finger 62, contact plate 63, finger 64, conductor 65, armature 66 of the motor which drives wheel 10, conductors 67, 68, armature 75 of the motor which drives wheel 12, conductor 76, finger 77, conducting plate 78, finger 79, conductor 80, field winding 81 of the motor which drives wheel 12, conductor 82, finger 83, plate 84, conductor 85, plate 86, finger 87, conductor 88 to the opposite pole of battery 45.

It will be noted that in parallel with field winding 60 of the motor which drives the wheel 10, is the field winding 70 of the motor which drives wheel 11, the circuit being provided by means of conductors 71, 72, extending in substantially the vertical plane of the frame member 18. Similarly, the armature 73 of the motor which drives wheel 11 is connected in parallel with armature 66 of the motor which drives wheel 10.

On the other side of the truck the motor armature 75 is shunted by the armature 90 of the motor which drives wheel 13, and field winding 81 is shunted by the field 91 of the motor which drives wheel 13.

In position 2 of the controller, the contact plate 55 short circuits the resistance 53 and increases the current flow through the motors. In position 3 the connections of the controller are such that all the motors of the two sides of the truck are parallel.

The present invention relates particularly to the conditions prevailing in positions 1 and 2 of the controller, and more particularly to such conditions when going around a curve.

Figure 2 represents a schematic circuit of the conditions in position 2 of the controller, and shows the battery 45 in series with the two parallelly arranged motors of one side of the truck in series with the two parallelly arranged motors of the opposite side. When the truck is moving in a straight line, the current flow through the two motors of one of the sides is substantially equal, since the motors are running at substantially the same speed, it being understood that the motors are of similar design and substantially equal ohmic resistance.

The conditions prevailing when the truck is run around a curve is shown in Figure 3. The design of the steering gear is such that when going around a curve having its center at a point such as 95, the planes of the wheels are each perpendicular to radial lines extending through the point 95, and thus the travel of wheels 10 and 11 is substantially in the arc 96—96, while the travel of wheels 12 and 13 is substantially in the arc 97—97. Since the radius of the arc 96—96 is less than that of the arc 97—97, it follows that the travel or rate of rotation of the wheels 10, 11 is less than that of the opposite wheels 12, 13. Unlike counter electromotive forces are thus set up in the armatures of the motors 10, 11 with respect to those of motors 12, 13.

In structures of the prior art the operation of motors when rounding sharp curves has been unsatisfactory, due to the counter electromotive forces of the different motors reacting on each other. In some cases it has happened that the speeds of the motors were so related that one or more of the motors acted as generators. It can be readily seen that the driving forces of such structures were unbalanced. Thus it was difficult to operate such trucks around curves.

With the present invention, however, the counter electromotive forces are substantially balanced, the motors having equal counter electromotive forces being electrically connected so that their armatures are in parallel. Thus it will be seen that according to the present invention, the current divides itself substantially equally between the two motors of each side, independently of the radius of the curve around which the truck is being moved. Thus the operation of the truck is rendered highly efficient even when going around sharp curves, and control of speed is materially improved.

Furthermore, the wiring of the truck is extremely simple, there being no wires crossing transversely from one wheel of a pair to its opposite wheel, and thus there is no interference with the operation of the steering mechanism.

The present embodiment is one of a variety of forms in which the invention may be practiced, and it is, therefore, understood that the scope is not to be limited thereby, reference being had to the appended claims for that purpose.

What I claim is:—

1. In a motor truck, a plurality of wheels, steering means for turning the planes of the wheels into unlike directions, and driving motors for each of the wheels, the armatures of the motors on each side of the truck being connected in shunt with each other.

2. In a motor truck, a plurality of wheels, two on each side, steering means for turning the planes of the wheels into unlike directions, and driving motors for each of the wheels, the armature of one motor of each side being connected in shunt with the armature of another motor on the same side.

3. In a motor truck, a plurality of wheels, a motor for each wheel, and means for driving some of said wheels at relatively different rates, said motors being arranged to compensate for differences in counter electromotive forces set up in the motor armatures by operation at relatively different rates.

4. In a motor vehicle, a plurality of wheels, means for varying the angularity of the wheels in unlike degrees for steering the vehicle around a curve, a driving motor for each of the wheels, and electrical connections bridging the armatures of the motors in lateral pairs.

5. In a motor vehicle, means for driving said vehicle around a common center comprising a plurality of wheels and means for varying the angularity of said wheels to be substantially perpendicular to radii passing through the common center, a driving motor for each wheel, and electrical means or conductors interconnecting the armatures of the motors of those wheels which are substantially equi-distant from said center.

6. In a motor vehicle, means for driving said vehicle around a common center comprising a plurality of wheels and means for varying the angularity of said wheels to be substantially perpendicular to radii passing through the common center, a driving motor for each wheel, each motor having an armature and a series field winding and electrical means interconnecting the armatures and field windings of the motors of those wheels which are substantially equi-distant from said center.

7. In a motor vehicle, means for driving said vehicle around a common center comprising a plurality of wheels and means for varying the angularity of said wheels to be substantially perpendicular to radii passing through the common center, a driving motor for each wheel, and means shunting the armatures of the motors of those wheels which are substantially equi-distant from said center by one another.

8. In a motor vehicle, a plurality of wheels, a driving motor for each wheel, a source of energy for actuating the motors, a controller constructed to connect the source of energy to said motors in transverse pairs in series and connections bridging the armatures of the motors in longitudinal pairs.

9. In a motor vehicle, a plurality of wheels, a driving motor for each wheel, a source of energy for actuating the motors, a controller constructed to connect the source of energy to said motors in series relation, the motors of one side of the vehicle being in series with the motors of the other side, and connections between the armatures of the motors of each of the sides whereby the armatures of each side are in parallel.

10. In a motor vehicle, a plurality of wheels, a driving motor for each wheel, each driving motor having a field winding and an armature in series, a source of energy for actuating the motors, a controller constructed to connect the source of energy to said motors in series relation with the motors of one side of the vehicle in series with the motors of the other side, and connections between the armatures and fields of the motors of each of the sides whereby the armatures and the fields of each side are in parallel respectively.

11. In a motor vehicle, a plurality of wheels, a driving motor for each wheel, a source of energy for actuating the motors, a controller having a plurality of stopping positions, constructed to connect, in at least one of its positions, the source of energy to said motors in series transversely of the vehicle, and in another position to connect the source of energy to the motors in multiple, and connections for shunting the armatures of the motors of each of the sides by one another.

12. In a motor vehicle, a plurality of wheels, a driving motor for each wheel, each motor having an armature and a series field winding, a source of energy for actuating the motors, a controller having a plurality of stopping positions constructed to connect in at least one of its positions the source of energy to said motors in series transversely of the vehicle, and in another position to connect the source of energy to the motors in multiple, and connections for shunting the armatures of the motors of each of the sides by one another and for shunting the field windings of the motors of each of the sides by one another.

13. In a vehicle, electric motors for driving the vehicle, and electrical connection for supplying energy to the motors whereby the armatures of the motors on one side of the truck are connected in parallel.

14. In a vehicle, electric motors for driving the vehicle, and electrical connection for supplying energy to the motors whereby the fields of the motors on one side of the truck are connected in parallel.

15. In a vehicle, electric motors for driving the vehicle, and electrical connection for supplying energy to the motors whereby the armatures and fields of the motors on one side of the truck are connected in parallel respectively, said armatures and field windings being connected electrically in series with one another.

16. In a motor vehicle, means for driving said vehicle around a common center comprising a plurality of wheels, and means for varying the angularity of said wheels to be substantially perpendicular to radii passing through the common center, a driving motor for each wheel, and electric conductors for connecting the armatures of the motors of those wheels which are substantially equi-distant from said center in parallel with one another.

17. In a motor vehicle, means for driving said vehicle around a common center comprising a plurality of wheels, and means for controlling the angularity of said wheels, a driving motor for each wheel, and electric conductors for connecting the armatures of the motors of those wheels which are substantially equi-distant from said center in parallel with one another.

In witness whereof, I have hereunto set my hand this 14th day of December, 1921.

FREDERICK FRANZ.